United States Patent
Zelezniak et al.

(10) Patent No.: US 12,082,106 B2
(45) Date of Patent: Sep. 3, 2024

(54) SHARING OF BASEBAND UNITS IN FIFTH GENERATION NETWORKS AND BEYOND

(71) Applicant: AT&T Intellectual Property I, L.P., Atlanta, GA (US)

(72) Inventors: Aleksandr Zelezniak, Morganville, NJ (US); Kaustubh Joshi, Short Hills, NJ (US); Shankaranarayanan Puzhavakath Narayanan, Cherry Hill, NJ (US); Gueyoung Jung, Belle Mead, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 360 days.

(21) Appl. No.: 17/681,511

(22) Filed: Feb. 25, 2022

(65) Prior Publication Data
US 2023/0276354 A1    Aug. 31, 2023

(51) Int. Cl.
  *H04W 52/02*    (2009.01)
  *H04W 24/08*    (2009.01)
(52) U.S. Cl.
  CPC ....... *H04W 52/0203* (2013.01); *H04W 24/08* (2013.01)
(58) Field of Classification Search
  CPC ......... H04W 28/0268; H04W 36/0007; H04W 36/18; H04W 8/24; H04W 4/70; H04W 52/0203
  (Continued)

(56) References Cited

U.S. PATENT DOCUMENTS 11,039,490 B2 *  6/2021  Majmundar .......... H04L 5/0033
11,095,559 B1     8/2021  Garvia et al.
(Continued)

FOREIGN PATENT DOCUMENTS

CN   111869278 B  *  4/2022  ......... H04L 43/0852
CN   116349255 A  *  6/2023  ......... H04W 36/0007
(Continued)

OTHER PUBLICATIONS

L. M. Moreira Zorello, M. Sodano, S. Troia and G. Maier, "Power-Efficient Baseband-Function Placement in Latency-Constrained 5G Metro Access," in IEEE Transactions on Green Communications and Networking, vol. 6, No. 3, pp. 1683-1696, Sep. 2022, doi: 10.1109/TGCN.2022.3152839 (Year: 2022).*

(Continued)

*Primary Examiner* — William D Cumming
(74) *Attorney, Agent, or Firm* — Guntin & Gust, PLC; Miyoung Shin

(57) ABSTRACT

Described is allocating and deallocating baseband unit resources of a distributed unit based on anticipated and/or actual demand for the resources. For example, when user equipment transitions to a connected state, a corresponding message can be detected and used to determine whether sufficient baseband unit resources are needed to handle the traffic of the newly connecting user equipment. If not, additional baseband unit resources are allocated. When user equipment transitions to an inactive state, the corresponding command can be detected and used to determine whether the baseband unit resources are still needed for other traffic. If not, baseband unit resources are deallocated; that is, if a distributed unit's resources are no longer needed, the distributed unit's resources are deactivated to reduce resource consumption. Deallocation can be performed by changing the resources to a power conservation (e.g., sleep) state, with (Continued)

allocation performed by changing such resources back to an active state.

20 Claims, 10 Drawing Sheets

(58) Field of Classification Search
USPC .......................................................... 370/311
See application file for complete search history.

(56) References Cited

U.S. PATENT DOCUMENTS

| | | | |
|---|---|---|---|
| 11,304,109 | B1 | 4/2022 | Potharaju et al. |
| 11,910,453 | B2 * | 2/2024 | Majmundar ............ H04W 4/70 |
| 2018/0270869 | A1 | 9/2018 | Tsai |
| 2020/0107307 | A1 | 4/2020 | Nammi et al. |
| 2020/0145154 | A1 | 5/2020 | Black et al. |
| 2020/0196220 | A1 | 6/2020 | Centonza et al. |
| 2020/0274656 | A1 | 8/2020 | Gordaychik |
| 2020/0351955 | A1 | 11/2020 | Jeon et al. |
| 2021/0274580 | A1 * | 9/2021 | Majmundar ............ H04W 8/24 |
| 2022/0159510 | A1 | 5/2022 | Jang et al. |
| 2022/0167418 | A1 | 5/2022 | Zelezniak et al. |
| 2023/0276354 | A1 * | 8/2023 | Zelezniak ......... H04W 52/0203 370/311 |
| 2023/0388882 | A1 * | 11/2023 | Wang .................... H04W 36/18 |
| 2023/0422279 | A1 * | 12/2023 | Zelezniak ............. H04W 76/30 |
| 2024/0064625 | A1 * | 2/2024 | Akman ............. H04W 28/0268 |

FOREIGN PATENT DOCUMENTS

| | | | |
|---|---|---|---|
| EP | 3618518 | 3/2020 | |
| EP | 3879886 A1 | 9/2021 | |
| WO | 2020096860 | 5/2020 | |
| WO | 2020144637 | 7/2020 | |
| WO | 2021135416 | 7/2021 | |
| WO | 2022087603 | 4/2022 | |
| WO | WO-2022086217 A1 * | 4/2022 | ............ H04W 36/18 |
| WO | WO-2024035295 A1 * | 2/2024 | |

OTHER PUBLICATIONS

Non-Final Office Action for U.S. Appl. No. 17/104,458 dated Mar. 21, 2022.
Jung, et al., "Pooling of Baseband Units in Fifth Generation Networks and Beyond," U.S. Appl. No. 17/653,545, filed Mar. 4, 2022.
Zelezniak, et al., "Baseband Unit Pooling Using Shared Scheduler," U.S. Appl. No. 17/809,363, filed Jun. 28, 2022.
Notice of Allowance received for U.S. Appl. No. 17/098,619 dated Oct. 18, 2022.
Notice of Allowance received for U.S. Appl. No. 17/104,458 dated Aug. 10, 2022, 39 pages.
Notice of Allowance received for U.S. Appl. No. 17/104,458 dated Sep. 1, 2022, 17 pages.
Notice of Allowance received for U.S. Appl. No. 17/104,458 dated Nov. 23, 2022, 16 pages.

* cited by examiner

SHARING OF BASEBAND UNITS IN FIFTH GENERATION NETWORKS AND BEYOND

TECHNICAL FIELD

The subject application relates to wireless communications systems in general, and more particularly to New Radio (NR) for advanced networks, including fifth generation (5G) cellular wireless communications systems and/or other next generation networks.

BACKGROUND

In fifth generation (5G) cellular wireless communications systems, the cost-of-service deployment is significantly increased relative to prior systems in part because 5G uses higher frequencies than the currently wide-deployed wireless technologies such as LTE. The signals using these frequencies allow the network service providers to offer faster speeds and reduced data access latency to its customers compared to any previous generation technologies. However, the higher frequency signals travel considerably shorter distances, dissipate much easier, and penetrate obstacles far less than do the signals of the previous generation technologies do.

As a result, to provide the same service coverage, 5G service needs a far-denser deployment than other existing wireless technologies. Offering 5G services thus presents a substantial burden on service providers in terms of capital and operational cost. A significant portion of the deployment cost results from the cost of the baseband units that communicate data between radio access network nodes and the core network. Moreover, once deployed, such baseband units contribute to the overall operational cost, including energy consumption.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
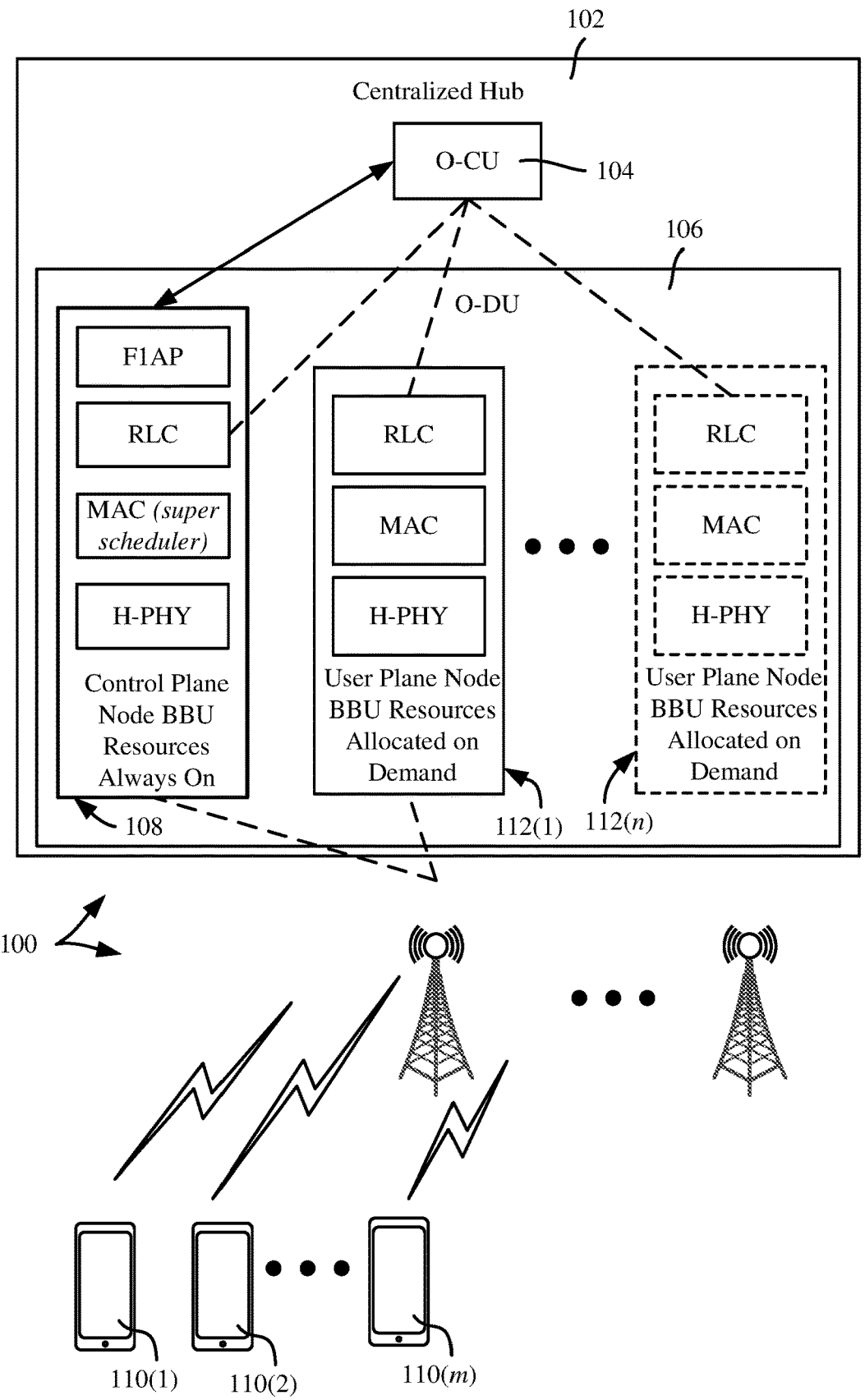
FIG. 1 is a block diagram illustrating an example network communication system in which a hub contains a centralized unit and distributed unit components including distributed unit components allocated and deallocated on demand, in accordance with various aspects and embodiments of the subject disclosure.

The technology described herein is generally directed towards allocating and deallocating resources of baseband units (BBUs) on demand, whether actual demand and/or anticipated demand based on historical statistics, special events or the like. The technology is based on a disaggregated baseband unit model where different components are running in possibly separate computer hardware and can be deployed and scaled independently. Baseband unit elements are located in a centralized location (a hub) and can serve multiple wireless sites (cells/sectors). Similar to the cloud architecture, when the functional units are deployed, the technology described herein solution can leverage commercial off-the-shelf platforms (e.g., x86 servers) with hardware accelerators (e.g., FPGAs, GPUs, ASICs) and can help to save cost in comparison to using vendor-specific devices.

In one aspect, described are "always-on" distributed unit components that maintain RAN (radio access network) operation even when no users are present in the network present. In general, the always-on components are responsible for handling broadcasts/physical random access channel (PRACH) requests/sounding reference signal (SRS) communications and the like for each cell associated with the hub.

As will be understood, the technology described herein facilitates deploying baseband units in a cost-efficient way by meeting the actual demand of the network service. This is in contrast to current deployment models in which the service providers need to deploy baseband units at each of the service areas even when the demand is very low, which results in significant investment for unnecessary and underutilized baseband units at the initial stage of deployment; (indeed, many baseband units may be idle due to overprovisioning or low demand and thus do nothing but waste electricity).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNodeB (gNB)," "evolved Node B (eNodeB)," "home NodeB (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a hub 102 (e.g., centralized hub) comprises a centralized unit 104 (O-CU) and a distributed unit 106 (O-DU), where "O" refers to "Open" from the Open Radio Access Network (O-RAN) part of O-RAN. The distributed unit 106 includes the always-on control plane node baseband unit (BBU) resources 108 that allow user equipment 110(1)-**110(*m*) to connect to the network. The distributed unit 106 also includes allocated-on demand user plane node baseband unit (BBU) resources 112(1)-112(*n*)** as described herein. Note that if there is no actual demand (no currently active user equipment (UE)), there may not be any active allocated-on demand user plane node baseband unit (BBU) resources, although it is feasible in times of no demand to have one or more active user plane nodes in anticipation of demand.

Figure 2:
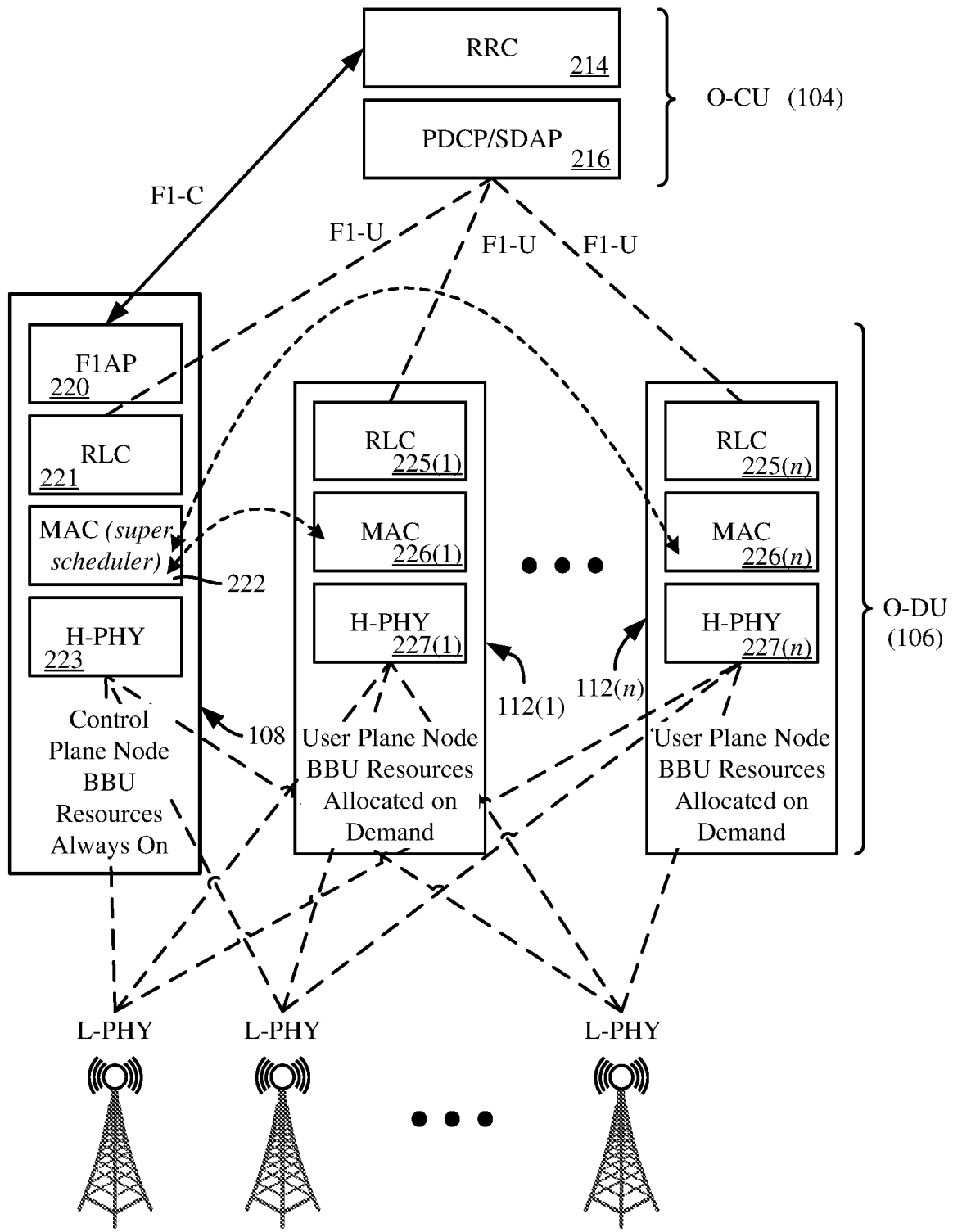
FIG. 2 is a block/dataflow diagram illustrating an example network communication system in which a hub contains a centralized unit and distributed unit components including distributed unit components allocated and deallocated on demand, in accordance with various aspects and embodiments of the subject disclosure.

As shown in FIG. 2, the centralized unit (O-CU) 104 comprises a radio resource control (RRC) 214 and a packet data convergence protocol (PDCP) layer coupled to a service data adaptation protocol (SDAP) layer, shown in FIG. 2 as a single PDCP/SDAP block 216. The radio resource control (RRC) 214 is coupled by F1 interface control (F1-C) signaling between the centralized unit 104 and an F1 interface application protocol handler (F1AP) 220 of the always-on control plane (primary) node baseband unit resources 108 to distribute baseband processing of users' traffic across multiple nodes of a 5G new radio system.

In addition to the F1AP handler 220, the always-on control plane node baseband unit resources 108 includes a radio link control protocol layer (RLC) 221, a medium access control layer (MAC) protocol layer (MAC) 222 and a high physical layer (H-PHY). The centralized MAC operates as a "super scheduler" to allocate a subset of carrier's bandwidth to local schedulers (collocated with RLC/MAC/L1) components, allowing load balancing of cell's traffic across multiple distributed units as well as consolidation of processing in a lesser number of distributed units when load in the system low.

As also shown in FIG. 2, the distributed unit 106 also includes user plane node baseband resources 112(1)-112(n) allocated on demand. These resources 112(1)-112(n) respectively include radio link control protocol layers (RLC) 225(1)-225(n), medium access control layer (MAC) protocol layers 226(1)-226(n) and high physical layers (H-PHY) 227(1)-227(n). The baseband unit functions high physical layers are functionally disaggregated from the low physical layer (L-PHY) baseband unit functions of the radio units, in general limiting deployment of the baseband unit functions to those currently in need.

The RLCs 221 and 225(1)-225(n) communicate with the components of the PDCP/SDAP block 216 via F1 interface user (F1-U) signaling. During a UE's transition to RRC connected state (FIG. 3, based on the F1-C message from the O-CU), the F1AP handler 220 and MAC super scheduler 222 can allocate the secondary node(s) 112(1)-112(n) (the RLC/MAC/h-PHY components) on demand as needed and can assign a range of cell's subcarriers to process the UE's traffic. A local-to-assigned node MAC scheduler does the remainder of the work. Note that the allocation of subcarriers by the MAC super scheduler 222 needs information exchange between the MAC super scheduler 222 and distributed MACs, e.g., represented in part by the dashed, curved arrows to the MAC 226(1) and the MAC 226(n).

It should be noted that the secondary node(s) 112(1)-112(n) can be allocated or deallocated on demand based on anticipating their need. For example, every business day at 4 pm historical data indicates that more nodes need to be allocated until 8 pm, at which time nodes can be deallocated. Instead of or in addition to anticipated need, another way that the secondary node(s) 112(1)-112(n) can be allocated or deallocated on demand is based on dynamic mapping and remapping radio units to baseband units according to the user equipment connections to radio units coupled (via the L-PHY layer to the H-PHY) to the allocated on demand resources of the baseband units.

Figure 3:
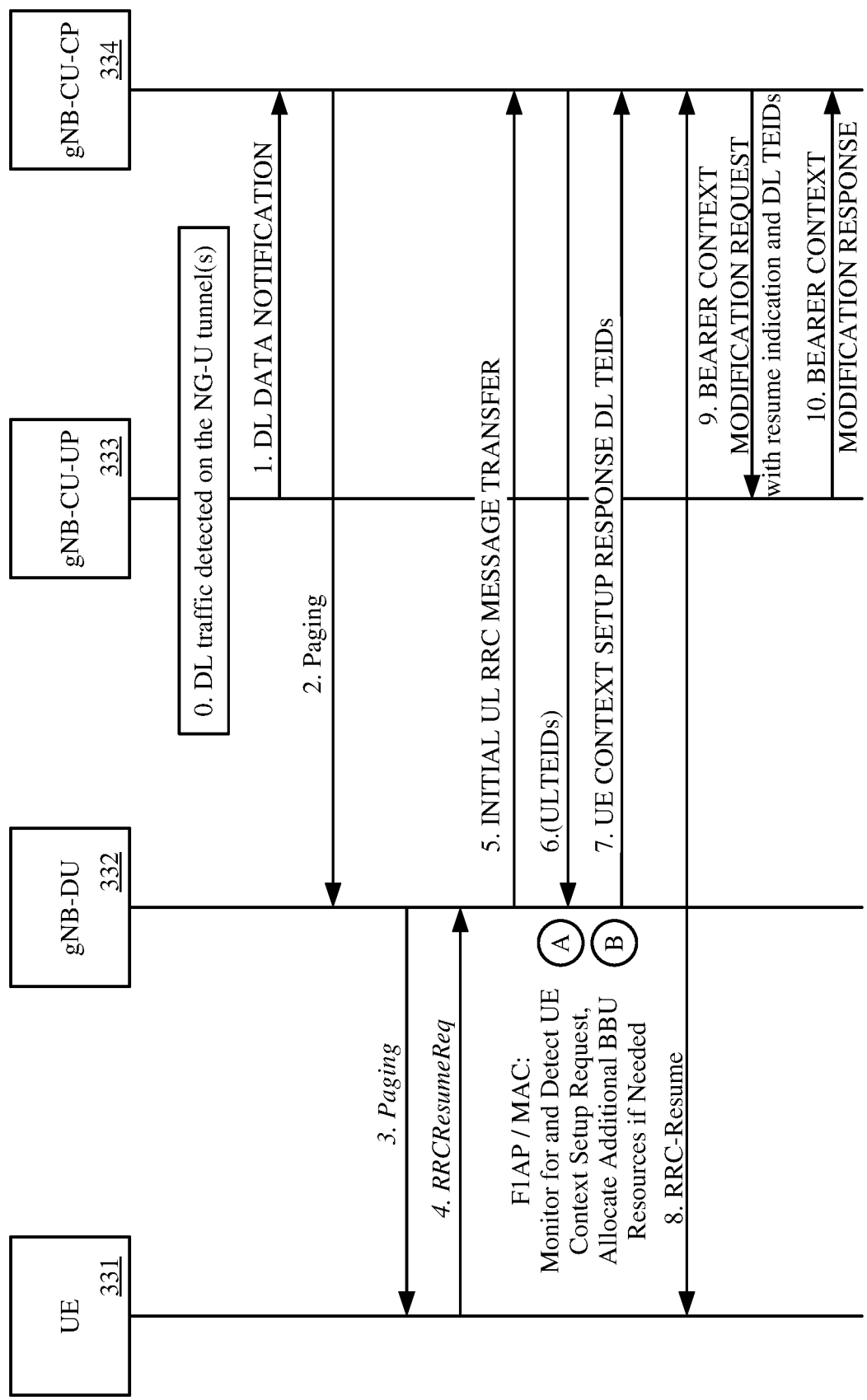
FIG. 3 is a dataflow diagram representing monitoring for and detecting a user equipment context Setup Request, and allocating baseband unit resources if needed, in accordance with various aspects and embodiments of the subject disclosure.

A user session as generally described herein can be the basis for determining on demand allocation or deallocation of the user plane (secondary) node baseband unit resources. For example, FIG. 3 shows an RRC inactive to RRC connected state transition of a UE 331, e.g., according to the third generation partnership project specification (3GPP TS 38.401 version 16.4.0 Release 16). The individual sequence operations of the transition are not described herein in detail except to note that, as set forth herein and as represented by circled letters "A" and "B" to the left of sequence operations six (6) and seven (7), the F1AP handler 220 (FIG. 2) is configured to monitor for and detect a user equipment (UE) context setup request from the gNodeB centralized unit control plane node 334 to the gNodeB distributed unit 332 as shown via the F1-C interface of FIG. 2; (note that ULTEIDs are uplink tunnel endpoint identifiers and DLTEIDs are downlink tunnel endpoint identifiers). Based on the detection of the context setup request, additional baseband resources are allocated if needed to process (handle) the user equipment traffic to and from a radio unit's L-PHY layer.

In case a group of multiple UEs can use the same time-frequency with MU-MIMO, the F1AP 220/MAC super scheduler 222 should, if possible, assign the same distributed unit server to that UE group. A similar UE grouping can be done for uplink scheduling of PUCCH formats and SRS.

An F1-C "UE Context Modification Required" message can be used by a distributed unit node to request modification of a long-lasting connection and possibly reassign a UE to another distributed unit node. The allocation of subcarriers to process a UE's or UE group's traffic can be done by considering, for example, a user equipment device type; (e.g., an IoT with a short-lived session and a small volume of traffic can be considered during allocation of the subcarriers). Subcarrier allocation can be done on a per-slot basis (with relatively frequent signaling between MACs and distributed MACs).

Figure 4:
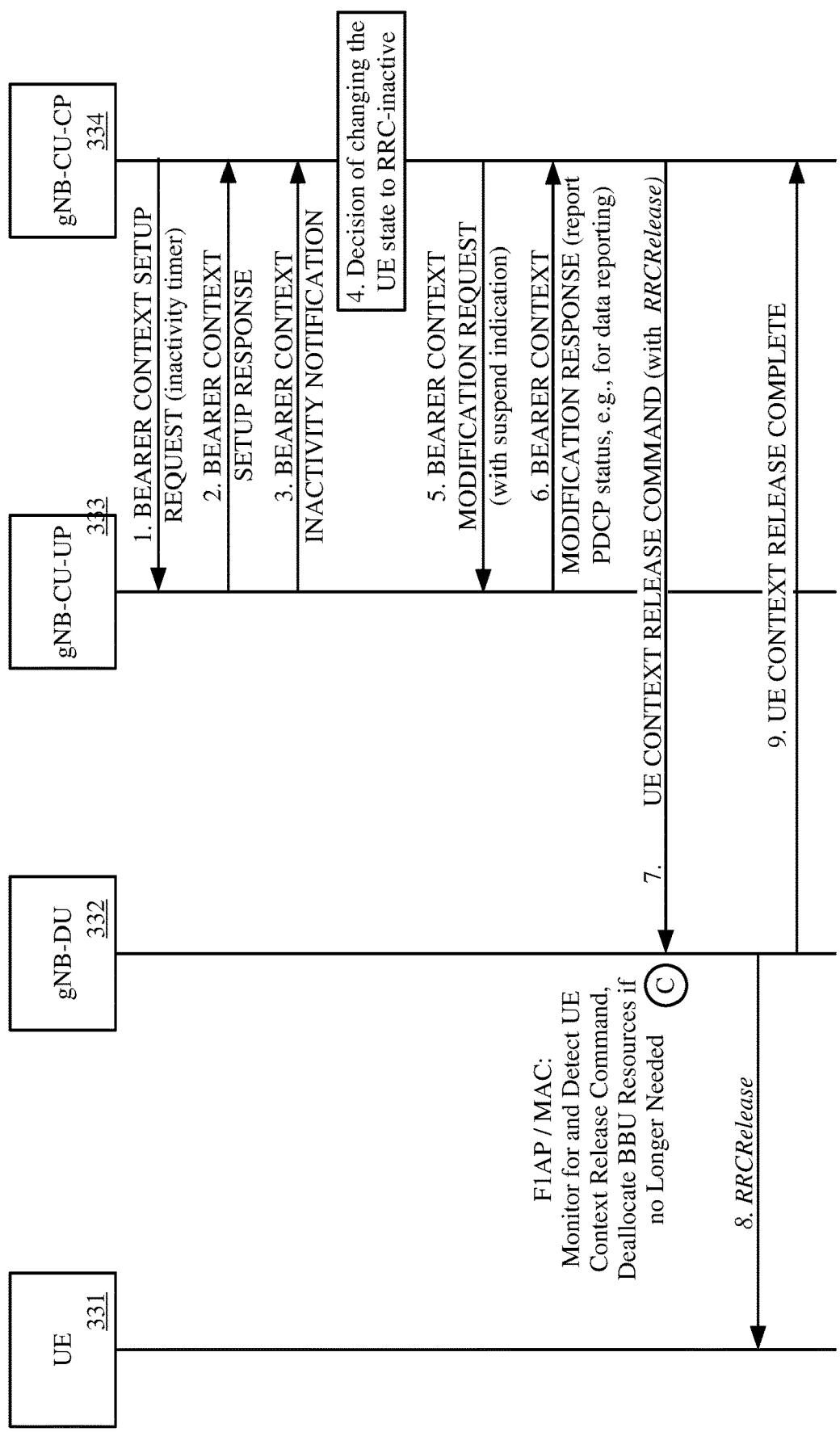
FIG. 4 is a dataflow diagram representing monitoring for and detecting a user equipment context release command, and deallocating baseband unit resources if no longer needed, in accordance with various aspects and embodiments of the subject disclosure.

As shown in FIG. 4, deallocation can be based on monitoring for and detecting an RRC connected to RRC inactive state transition, such as a UE context release command (with RRCRelease) from the gNodeB centralized unit control plane node 334 to the gNodeB distributed unit 332 according to the 3GPP TS 38.401 version 16.4.0 Release 16 standards. The individual sequence operations of this transition to inactive are not described herein in detail except to note that, as set forth herein and as represented by circled letter "C" to the left of sequence operation seven (7) of FIG. 4, the F1AP handler 220 (FIG. 2) is configured to monitor for and detect a UE context release command/request, as shown via the F1-C interface of FIG. 2. Based on the detection of the context release command, baseband resources (e.g., of a secondary node) are deallocated if no longer needed to process (handle) any other user equipment traffic. UE context should be released from the distributed unit node when the centralized unit 334 sends the UE context release message.

Figure 5:
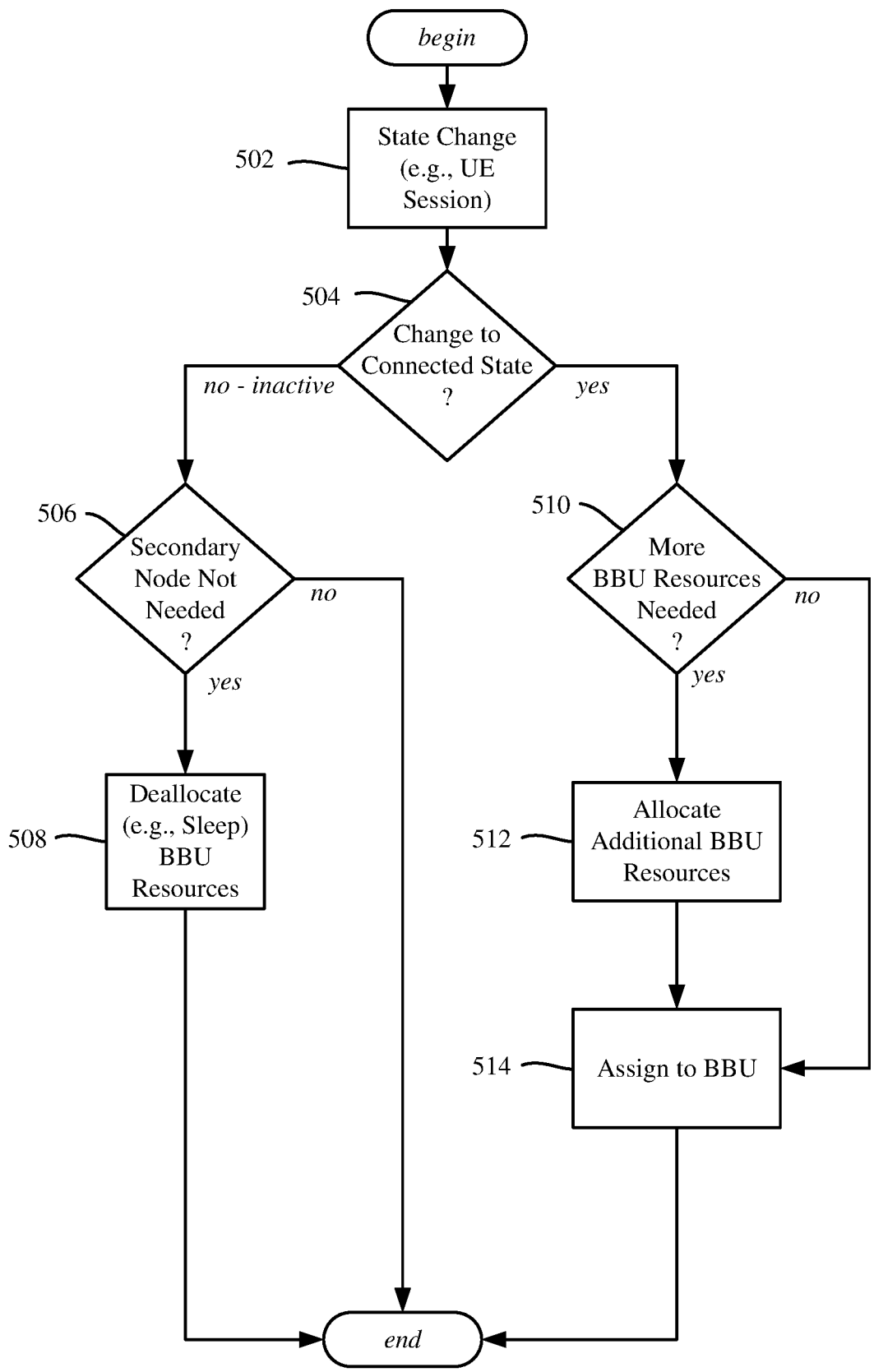
FIG. 5 is a flow diagram illustrating example operations related to allocating and deallocating baseband unit resources, in accordance with various aspects and embodiments of the subject disclosure

FIG. 5 shows some example logic/operations related to allocating or deallocating secondary node baseband unit resources upon detection of a UE session state change at operation 502, such as in FIG. 3 or 4. If a change to the inactive state, operation 502 branches to operation 504 to determine via operation 506 if the secondary node handling that UE is no longer needed because of the inactive transition. If at operation 506 the secondary node is still needed for other traffic, then the process ends. If at operation 506 the secondary node is no longer needed, the baseband unit resources of the secondary node are deallocated to conserve resources. Deallocation can be by powering them off, changing to a sleep state, idle state, or other reduced power/reduced frequency state that consumes less power.

Returning to operation 502, for a UE transition to the active state, operation 502 branches to operation 510 to determine via operation 510 if an additional secondary node/more baseband unit resources are need to handle that UE's traffic. If not, operation 512 is bypassed and operation 514 assigns the UE traffic to an existing BBU that can handle the traffic. Otherwise, operation 512 is performed to allocate the additional baseband unit resources as described herein and then assigns the UE traffic to the newly allocated baseband unit resources. Allocation can be by powering up resources, changing from a sleep state, idle state, or other reduced power/reduced frequency state to an active state.

Figure 6:
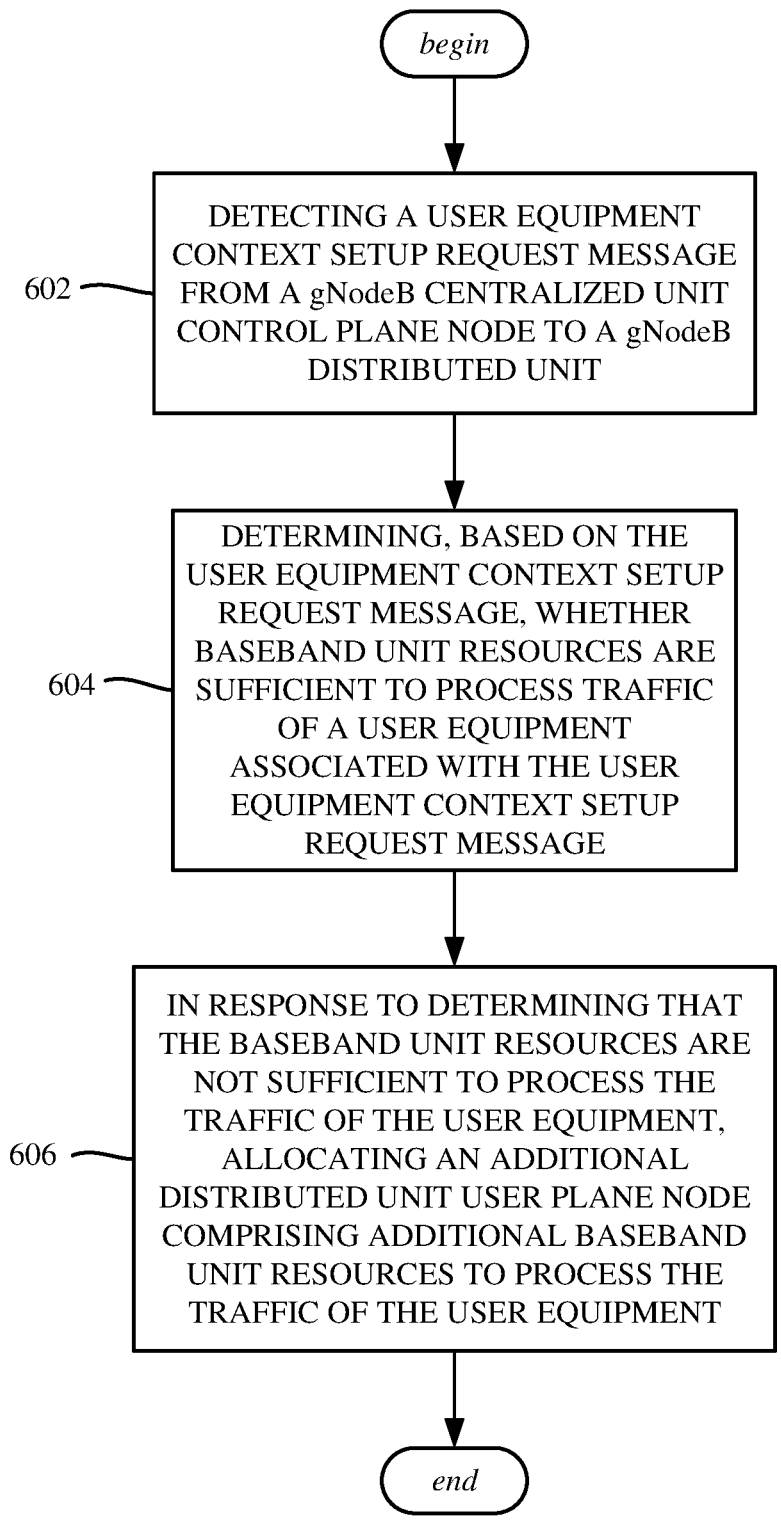
FIG. 6 illustrates example operations related to allocating an additional distributed unit user plane node comprising additional baseband unit resources to process the traffic of newly connected user equipment, in accordance with various aspects and embodiments of the subject disclosure.

One or more example aspects are represented in FIG. 6, and can correspond to a system, comprising a processor, and a memory that stores executable instructions that, when executed by the processor of the system, facilitate performance of operations. Example operation 602 represents detecting a user equipment context setup request message from a gNodeB centralized unit control plane node to a gNodeB distributed unit. Example operation 604 represents determining, based on the user equipment context setup request message, whether baseband unit resources are sufficient to process traffic of a user equipment associated with the user equipment context setup request message. Example operation 606 represents, in response to determining that the baseband unit resources are not sufficient to process the traffic of the user equipment, allocating an additional distributed unit user plane node comprising additional baseband unit resources to process the traffic of the user equipment.

Further operations can include, in response to determining that the baseband unit resources are sufficient to process the traffic of the user equipment, allocating an existing distributed unit user plane node comprising the baseband unit resources to process the traffic of the user equipment.

Detecting the user equipment context setup request message can be performed by an F1 interface application protocol handler of a distributed unit control plane node.

Allocating the additional distributed unit user plane node can include allocating a radio link control protocol layer, a medium access control layer and a high physical layer, and assigning a range of cell subcarriers to process the traffic of the user equipment.

Allocating the additional distributed unit user plane node can be performed by a medium access control scheduler of a distributed unit control plane node.

Allocating of the additional distributed unit user plane node can include changing the additional baseband unit resources from a first state in which the additional baseband unit resources are conserved to a second state in which the additional baseband unit resources are active. The first state in which the additional baseband unit resources are conserved can include at least one of: a sleep state, an idle state, a reduced power state or a reduced frequency state.

Further operations can include detecting a user equipment context release message from the gNodeB centralized unit control plane node to the gNodeB distributed unit, determining, based on the user equipment context release message, that the additional distributed unit user plane node is no longer needed for processing traffic, and deallocating the additional distributed unit user plane node. Deallocating the additional distributed unit user plane node can include changing the additional baseband unit resources from an active state to at least one of: a sleep state, an idle state, a reduced power state or a reduced frequency state.

Figure 7:
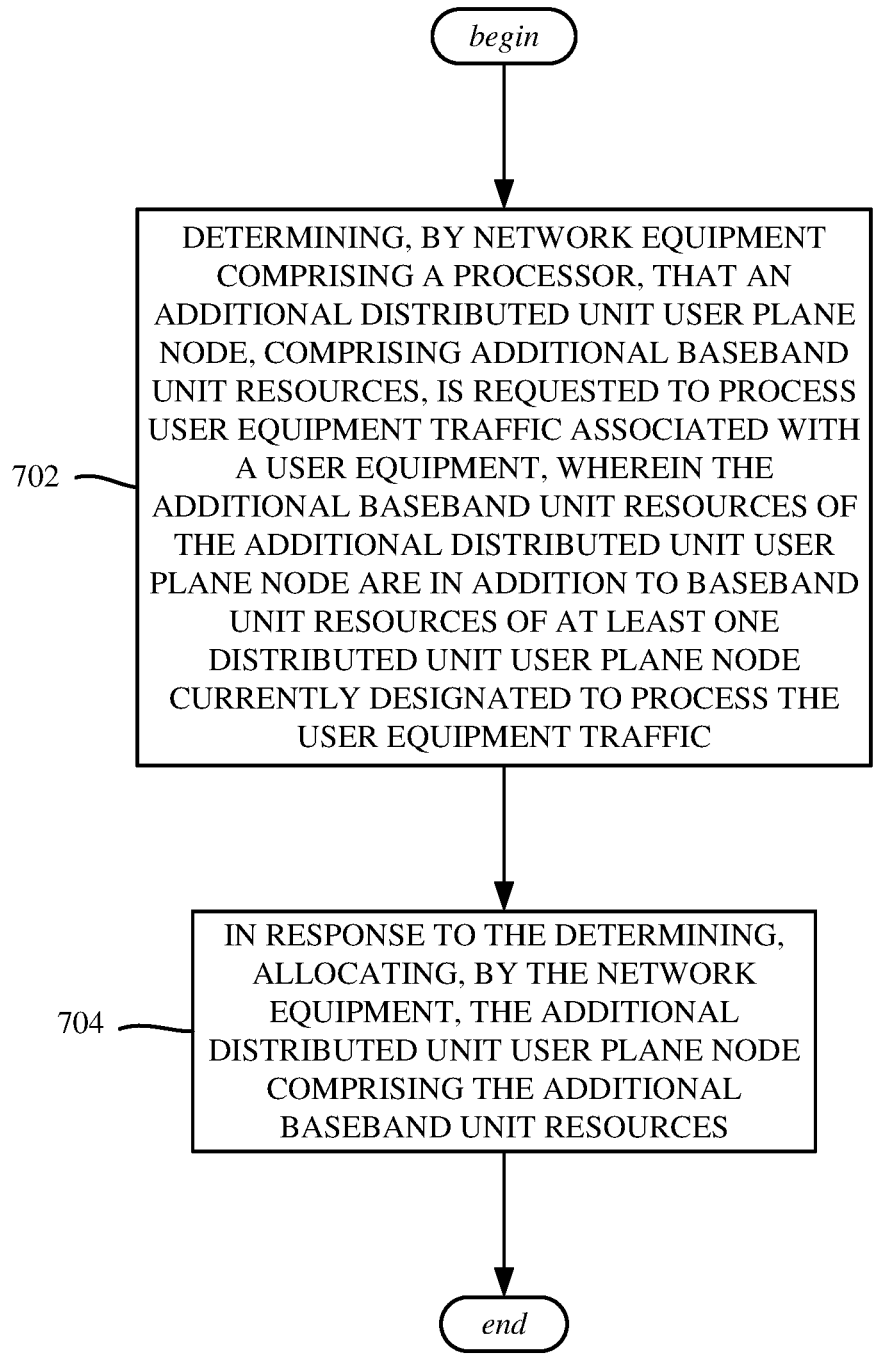
FIG. 7 illustrates example operations related to allocating additional distributed unit user plane node comprising the additional baseband unit resources, in accordance with various aspects and embodiments of the subject disclosure.

One or more example aspects are represented in FIG. 7, and can correspond to example operations of a method. Operation 702 represents determining, by network equipment comprising a processor, that an additional distributed unit user plane node, comprising additional baseband unit resources, is requested to process user equipment traffic associated with a user equipment, wherein the additional baseband unit resources of the additional distributed unit user plane node are in addition to baseband unit resources of at least one distributed unit user plane node currently designated to process the user equipment traffic. Operation 704 represents, in response to the determining, allocating, by the network equipment, the additional distributed unit user plane node comprising the additional baseband unit resources.

Determining that the additional distributed unit user plane node is requested can include evaluating traffic statistics.

Determining that the additional distributed unit user plane node is requested can include detecting a user equipment context setup request message from a gNodeB centralized u control plane node to a gNodeB distributed unit.

Further operations can include, determining, by the network equipment that the additional distributed unit user plane node is no longer requested to process the user equipment traffic, and, in response to the determining, deallocating, by the network equipment, the additional distributed unit user plane node.

Allocating the additional baseband unit resources can include transitioning the additional baseband unit resources from a first state in which the additional baseband unit resources are conserved to a second state in which the additional baseband unit resources are active, and deallocating of the additional baseband unit resources can include transitioning the additional baseband unit resources from the state in which the additional baseband unit resources are active to the first state in which the additional baseband unit resources are conserved.

Determining that the additional distributed unit user plane node is no longer requested can include evaluating traffic statistics.

Determining that the additional distributed unit user plane node is no longer requested can include detecting a user equipment context release message from a gNodeB centralized unit control plane node to a gNodeB distributed unit.

Figure 8:
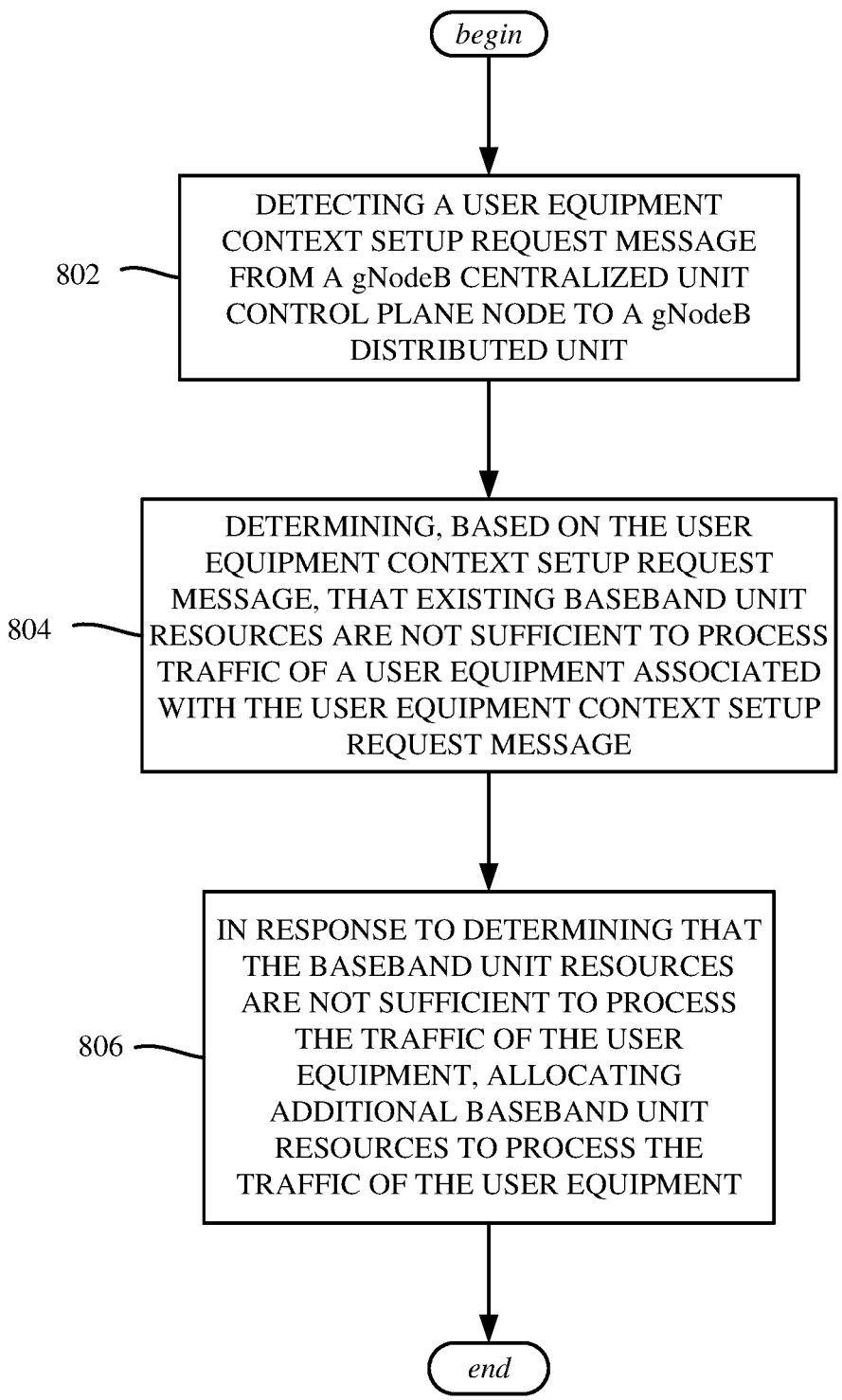
FIG. 8 illustrates example operations related to allocating additional baseband unit resources to process the traffic of newly connected user equipment, in accordance with various aspects and embodiments of the subject disclosure.

One or more aspects are represented in FIG. 8, such as implemented in a machine-readable medium, comprising executable instructions that, when executed by a processor, facilitate performance of operations. Example operation 802 represents detecting a user equipment context setup request message from a gNodeB centralized unit control plane node to a gNodeB distributed unit. Example operation 804 represents determining, based on the user equipment context setup request message, that existing baseband unit resources are not sufficient to process traffic of a user equipment associated with the user equipment context setup request message. Example operation 806 represents, in response to determining that the baseband unit resources are not sufficient to process the traffic of the user equipment, allocating additional baseband unit resources to process the traffic of the user equipment.

Allocating the additional baseband unit resources can include transitioning the additional baseband unit resources from a first state in which the additional baseband unit resources are conserved to a second state in which the additional baseband unit resources are active.

Further operations can include detecting a user equipment context release message from the gNodeB centralized unit control plane node to the gNodeB distributed unit, determining, based on the user equipment context release message, that the additional baseband unit resources are no longer needed to process the traffic of the user equipment, and in response to determining that the baseband unit resources are no longer needed to process to process the traffic of the user equipment, deallocating the additional baseband unit resources.

Deallocating the additional baseband unit resources can include transitioning the additional baseband unit resources from a first state in which the additional baseband unit resources are active to a second state in which the additional baseband unit resources are conserved.

As can be seen, the technology described herein facilitates the cost reduction of both capital and operational expenses, including adaptively increasing or decreasing network service capacity as demand increases or decreases, rather than provisioning a large initial deployment beyond the actual demand. The deployed baseband units include network functions that run on clusters or cloud environments, whereby a service provider can manage the baseband units in a flexible and efficient way, which further reduces maintenance cost. Further, a service provider can dynamically allocate processing units upon changing demand over time; for example, day versus night, special events, changing population and the like. This flexibility reduces underutilization and consequently reduces energy costs.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
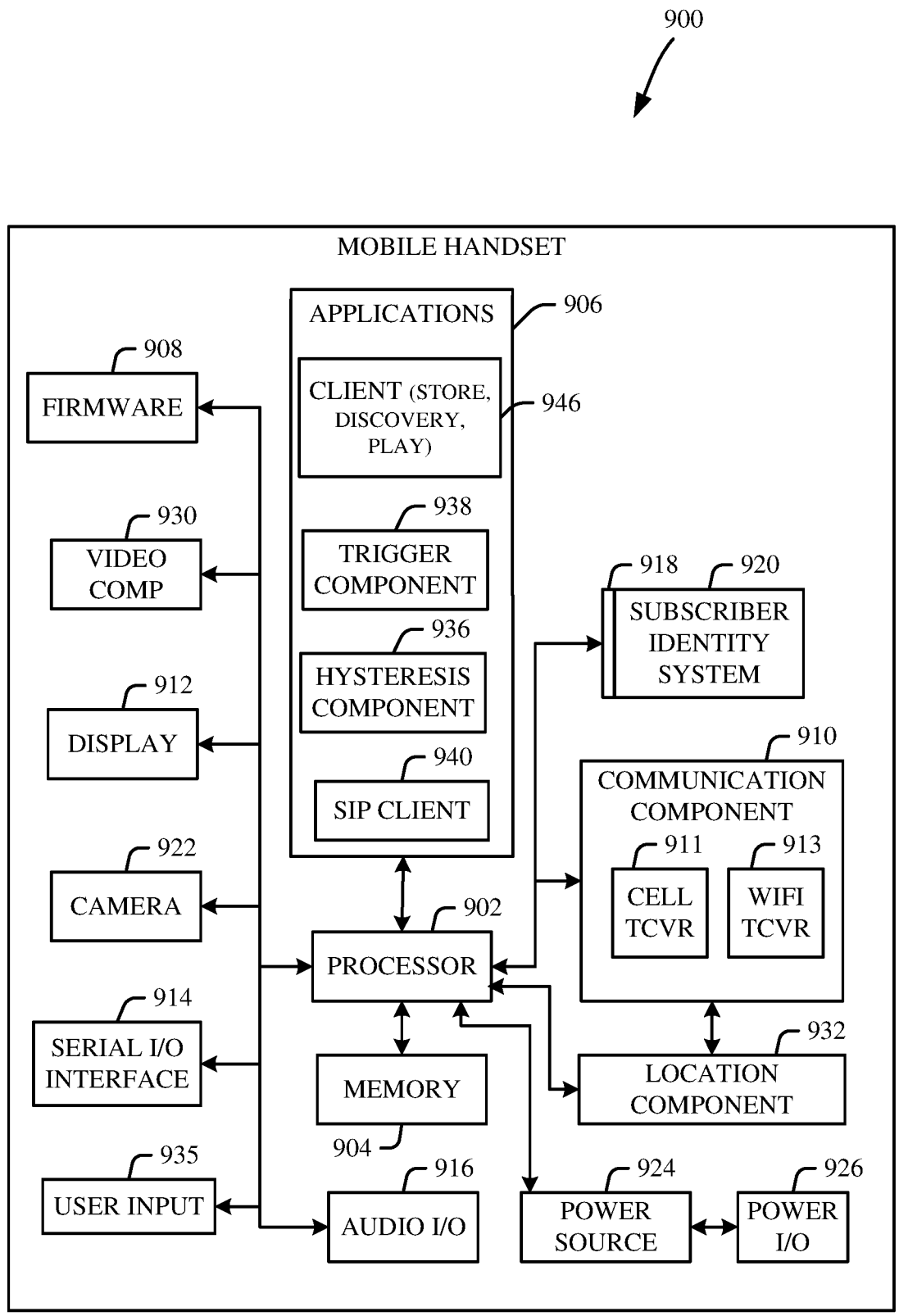
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
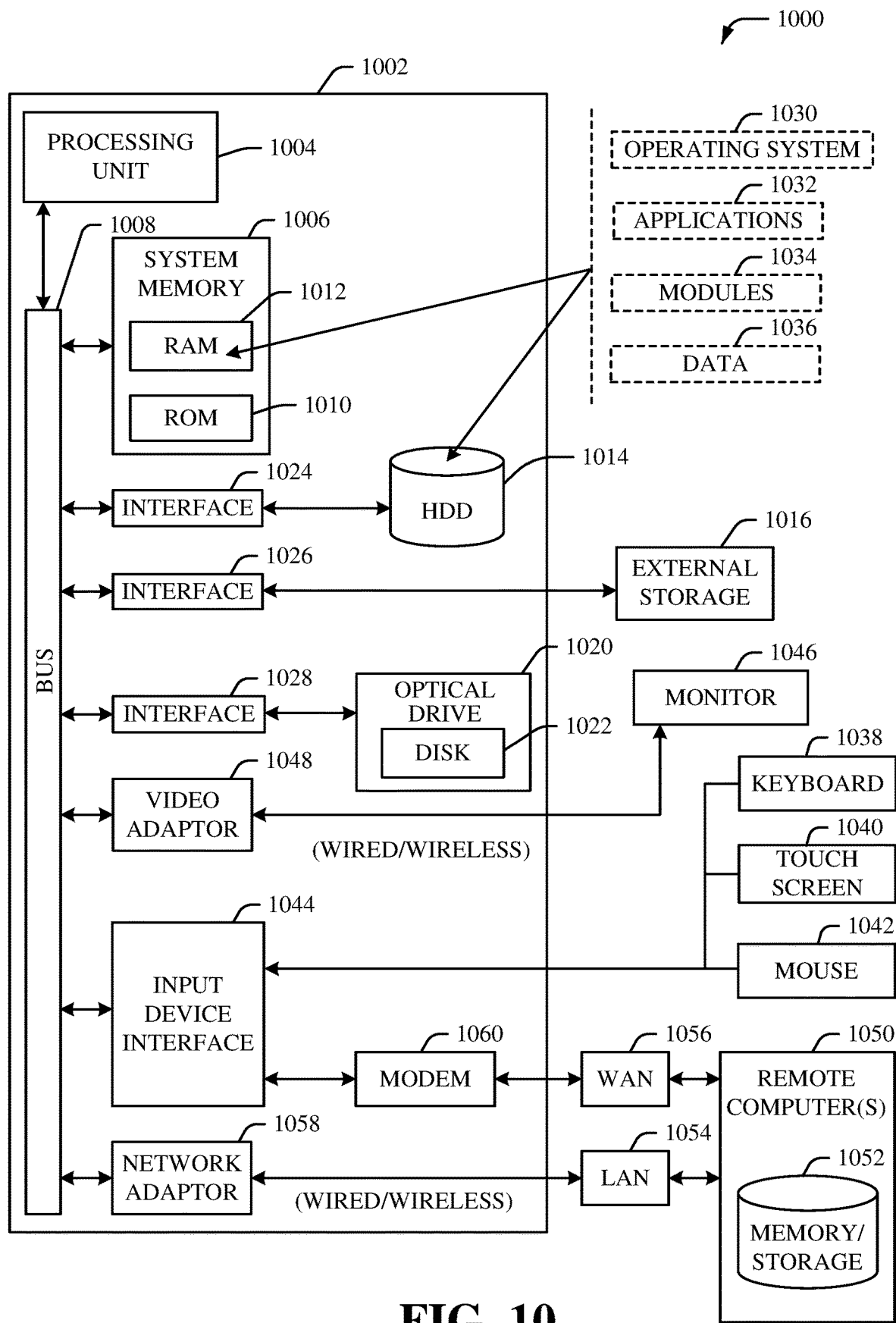
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
      detecting a user equipment context setup request message from a gNodeB centralized unit control plane node to a gNodeB distributed unit;
      determining, based on the user equipment context setup request message, whether baseband unit resources are sufficient to process traffic of a user equipment associated with the user equipment context setup request message; and
      in response to determining that the baseband unit resources are not sufficient to process the traffic of the user equipment, allocating an additional distributed unit user plane node comprising additional baseband unit resources to process the traffic of the user equipment.

2. The system of claim 1, wherein the operations further comprise, in response to determining that the baseband unit resources are sufficient to process the traffic of the user equipment, allocating an existing distributed unit user plane node comprising the baseband unit resources to process the traffic of the user equipment.

3. The system of claim 1, wherein the detecting of the user equipment context setup request message is performed by an F1 interface application protocol handler of a distributed unit control plane node.

4. The system of claim 1, wherein the allocating of the additional distributed unit user plane node comprises allocating a radio link control protocol layer, a medium access control layer and a high physical layer, and assigning a range of cell subcarriers to process the traffic of the user equipment.

5. The system of claim 1, wherein the allocating of the additional distributed unit user plane node is performed by a medium access control scheduler of a distributed unit control plane node.

6. The system of claim 1, wherein the allocating of the additional distributed unit user plane node comprises changing the additional baseband unit resources from a first state in which the additional baseband unit resources are conserved to a second state in which the additional baseband unit resources are active.

7. The system of claim 6, wherein the first state in which the additional baseband unit resources are conserved comprises at least one of: a sleep state, an idle state, a reduced power state or a reduced frequency state.

8. The system of claim 1, wherein the operations further comprise detecting a user equipment context release message from the gNodeB centralized unit control plane node to the gNodeB distributed unit, determining, based on the user equipment context release message, that the additional distributed unit user plane node is no longer needed for processing traffic, and deallocating the additional distributed unit user plane node.

9. The system of claim 8, wherein the deallocating of the additional distributed unit user plane node comprises changing the additional baseband unit resources from an active state to at least one of: a sleep state, an idle state, a reduced power state or a reduced frequency state.

10. A method, comprising:
   determining, by network equipment comprising a processor, that an additional distributed unit user plane node, comprising additional baseband unit resources, is requested to process user equipment traffic associated with a user equipment, wherein the additional baseband unit resources of the additional distributed unit user plane node are in addition to baseband unit resources of at least one distributed unit user plane node currently designated to process the user equipment traffic; and
   in response to the determining, allocating, by the network equipment, the additional distributed unit user plane node comprising the additional baseband unit resources.

11. The method of claim 10, wherein the determining that the additional distributed unit user plane node is requested comprises evaluating traffic statistics.

12. The method of claim 10, wherein the determining that the additional distributed unit user plane node is requested comprises detecting a user equipment context setup request message from a gNodeB centralized unit control plane node to a gNodeB distributed unit.

13. The method of claim 10, further comprising, determining, by the network equipment that the additional distributed unit user plane node is no longer requested to process the user equipment traffic, and, in response to the determining, deallocating, by the network equipment, the additional distributed unit user plane node.

14. The method of claim 13, wherein the allocating of the additional baseband unit resources comprises transitioning the additional baseband unit resources from a first state in which the additional baseband unit resources are conserved to a second state in which the additional baseband unit resources are active, and wherein the deallocating of the additional baseband unit resources comprises transitioning the additional baseband unit resources from the state in which the additional baseband unit resources are active to the first state in which the additional baseband unit resources are conserved.

15. The method of claim 13, wherein the determining that the additional distributed unit user plane node is no longer requested comprises evaluating traffic statistics.

16. The method of claim 13, wherein the determining that the additional distributed unit user plane node is no longer requested comprises detecting a user equipment context release message from a gNodeB centralized unit control plane node to a gNodeB distributed unit.

17. A non-transitory machine-readable medium, comprising executable instructions that, when executed by a processor, facilitate performance of operations, the operations comprising:
   detecting a user equipment context setup request message from a gNodeB centralized unit control plane node to a gNodeB distributed unit;
   determining, based on the user equipment context setup request message, that existing baseband unit resources are not sufficient to process traffic of a user equipment associated with the user equipment context setup request message; and
   in response to determining that the baseband unit resources are not sufficient to process the traffic of the user equipment, allocating additional baseband unit resources to process the traffic of the user equipment.

18. The non-transitory machine-readable medium of claim 17, wherein the allocating of the additional baseband unit resources comprises transitioning the additional baseband unit resources from a first state in which the additional baseband unit resources are conserved to a second state in which the additional baseband unit resources are active.

19. The non-transitory machine-readable medium of claim 17, wherein the operations further comprise:
   detecting a user equipment context release message from the gNodeB centralized unit control plane node to the gNodeB distributed unit;
   determining, based on the user equipment context release message, that the additional baseband unit resources are no longer needed to process the traffic of the user equipment; and
   in response to determining that the baseband unit resources are no longer needed to process to process the traffic of the user equipment, deallocating the additional baseband unit resources.

20. The non-transitory machine-readable medium of claim 19, wherein the deallocating of the additional baseband unit resources comprises transitioning the additional baseband unit resources from a first state in which the additional baseband unit resources are active to a second state in which the additional baseband unit resources are conserved.

* * * * *